(12) United States Patent
Jeong et al.

(10) Patent No.: US 8,411,427 B2
(45) Date of Patent: Apr. 2, 2013

(54) MOBILE TERMINAL

(75) Inventors: Byoung-Cheon Jeong, Seoul (KR); Hyo-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 160 days.

(21) Appl. No.: 12/750,504

(22) Filed: Mar. 30, 2010

(65) Prior Publication Data
US 2010/0277860 A1 Nov. 4, 2010

(30) Foreign Application Priority Data
Apr. 30, 2009 (KR) .................. 10-2009-0038546

(51) Int. Cl.
*H05K 5/00* (2006.01)
*H05K 7/00* (2006.01)
*H04M 1/00* (2006.01)

(52) U.S. Cl. ......... 361/679.27; 361/679.26; 361/679.28; 361/679.29; 361/679.3; 455/575.1; 455/575.4; 455/575.3

(58) Field of Classification Search .......... 361/681, 361/683, 679.01, 801, 804, 679.55, 679.22–679.3; 455/575.3, 550.1, 56; 16/367, 337, 319, 16/344, 336, 302, 342, 282, 283, 308, 368, 16/379, 343, 330
See application file for complete search history.

(56) References Cited

U.S. PATENT DOCUMENTS

| | | | |
|---|---|---|---|
| 5,383,138 A | 1/1995 | Motoyama et al. | |
| 2005/0153728 A1 | 7/2005 | Ronkko | |
| 2008/0009330 A1* | 1/2008 | Jung et al. | 455/575.3 |
| 2010/0265686 A1* | 10/2010 | Kilpinen | 361/807 |

FOREIGN PATENT DOCUMENTS

| | | |
|---|---|---|
| FR | 2799017 | 3/2001 |
| GB | 2350516 | 11/2000 |
| JP | 05094231 A * | 4/1993 |
| WO | 2007/140822 | 12/2007 |
| WO | 2008/101519 | 8/2008 |

* cited by examiner

*Primary Examiner* — Jayprakash N Gandhi
*Assistant Examiner* — Jerry Wu
(74) *Attorney, Agent, or Firm* — Lee, Hong, Degerman, Kang & Waimey

(57) ABSTRACT

Disclosed is a mobile terminal including a main body, an upper body having a display unit and disposed to be tiltable from the main body by a preset angle, a lower body having a user interface and disposed to be drawn out of the main body, and a driving unit configured to draw the lower body out of the main body in cooperation with the upper body being tilted from the main body.

20 Claims, 8 Drawing Sheets

MOBILE TERMINAL

CROSS-REFERENCE TO RELATED APPLICATION

Pursuant to 35 U.S.C. §119(a), this application claims the benefit of earlier filing date and right of priority to Korean Application No. 10-2009-0038546, filed on Apr. 30, 2009, the contents of which is incorporated by reference herein in its entirety.

BACKGROUND OF THE INVENTION

1. Field of the Invention

The present invention relates to a mobile terminal implementing a novel relative movement.

2. Background of the Invention

Terminals may be divided into mobile/portable terminals and stationary terminals according to their mobility. Also, the portable terminals may be categorized into a handheld terminal and a vehicle mount terminal according to whether it is directly portable by a user.

As it becomes multifunctional, the terminal can be allowed to capture still images or moving images, play music or video files, play games, receive broadcast and the like, so as to be implemented as an integrated multimedia player. Various attempts have been done for the multimedia device by hardware or software in order to implement such complicated functions. For example, a user interface environment is provided in order for users to easily and conveniently retrieve or select functions.

Also, many users have their own mobile terminals to express their own personalities, and accordingly, various designs are required for the portable terminals. Such terminals may be implemented in various types, such as a bar type, a slide type, a folder type, a swivel type and the like.

Recently, attempts have been made to provide users with a mobile terminal in a novel structure, capable of providing more convenient user interface environments, in addition to the aforementioned structures.

SUMMARY OF THE INVENTION

Therefore, an object of the present invention is to provide a mobile terminal implementing a novel relative movement, capable of further enlarging an installation space of components such as a display unit, a user input unit and the like, as well as implementing more convenient user interface environments.

To achieve these and other advantages and in accordance with the purpose of the present invention, as embodied and broadly described herein, there is provided a mobile terminal including, a main body, an upper body having a display unit and disposed to be tiltable from the main body by a preset angle, a lower body having a user interface and disposed to be drawn out of the main body, and a driving unit configured to draw the lower body out of the main body in cooperation with the upper body being tilted from the main body.

In one aspect of the present invention, the user interface may include at least one of a display unit configured to output visual information, and a user input unit configured to control operations of the mobile terminal.

The lower body may be drawn out of the main body from one end of the main body to another end thereof, and a rotational shaft of the upper body may be formed at a portion corresponding to the another end of the main body.

The driving unit may be configured to rotatably connect the upper body to the lower body, and convert a rotating motion of the upper body into a linear motion of the lower body.

The driving unit may include a driving force forwarding unit connected to the upper body and configured to forward a rotational force of the upper body to the lower body, and a driving force converting unit connected to the lower body and configured to convert the rotational force delivered from the driving force forwarding unit such that the lower body is linearly movable.

The foregoing and other objects, features, aspects and advantages of the mobile terminal according to the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of preferred configurations of mobile terminals according to the present invention, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together.

Mobile terminals described in the present invention may include mobile phones, smart phones, laptop computers, digital broadcasting terminals, personal digital assistants (PDAs), portable multimedia players (PMPs), navigators, and the like.

Figure 1:
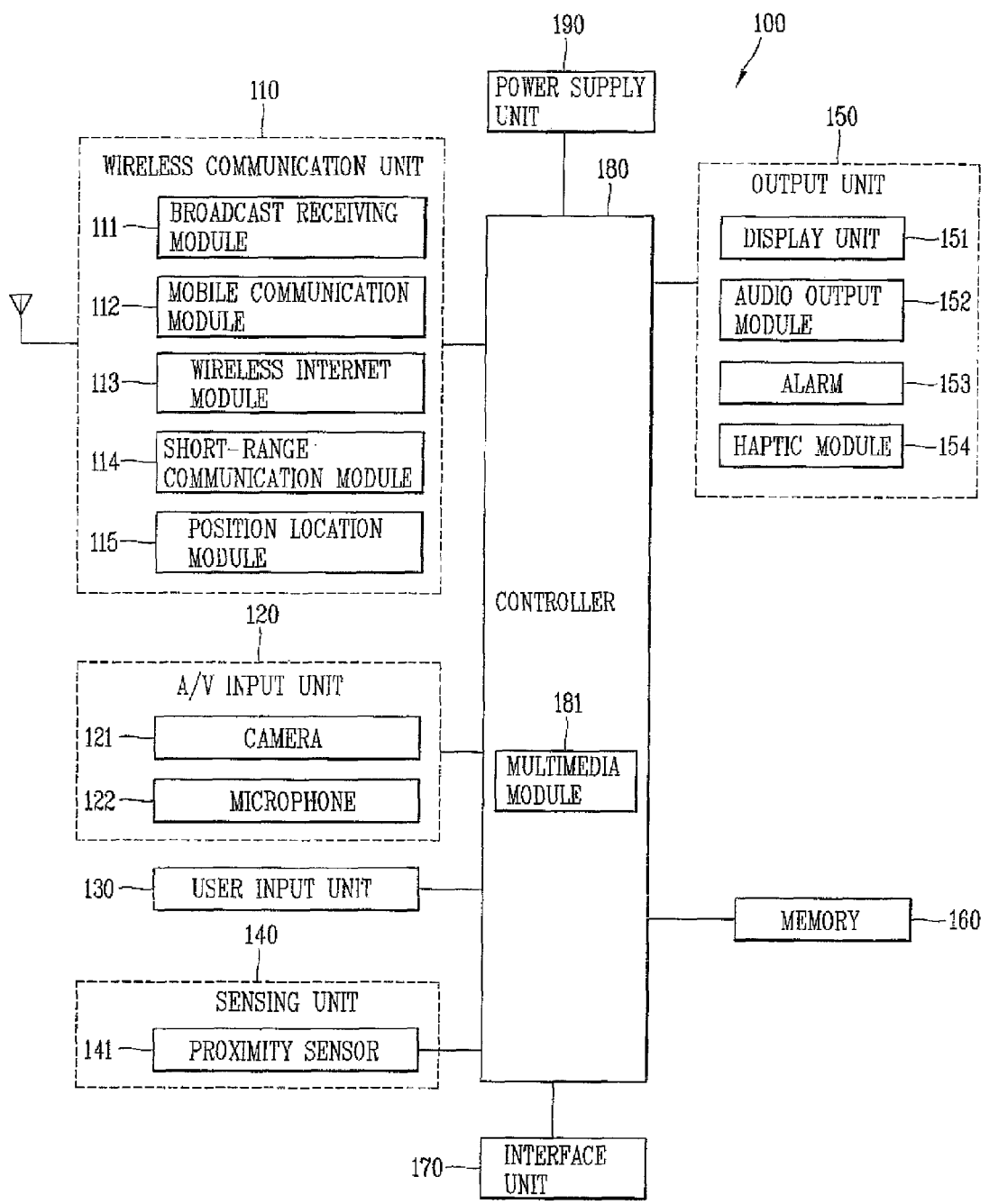
FIG. 1 is a block diagram of a mobile terminal in accordance with one embodiment of the present invention.

FIG. 1 is a block diagram of a mobile terminal in accordance with one exemplary embodiment of the present invention.

The mobile terminal 100 may comprise components, such as a wireless communication unit 110, an Audio/Video (A/V)

input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

Hereinafter, each component is described in sequence.

The wireless communication unit 110 may typically include one or more components which permit wireless communications between the portable terminal 100 and a wireless communication system or between the portable terminal 100 and a network within which the portable terminal 100 is located. For example, the wireless communication unit 110 may include a broadcast receiving module 111, a mobile communication module 112, a wireless Internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the portable terminal. The broadcast signal may be implemented as a TV broadcast signal, a radio broadcast signal, and a data broadcast signal, among others. The broadcast signal may further include a data broadcast signal combined with a TV or radio broadcast signal.

The broadcast associated information may indicate information relating to broadcast channels, broadcast programs or broadcast service providers. Further, the broadcast associated information may be provided via a mobile communication network and received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless Internet module 113 supports wireless Internet access for the portable terminal. This module may be internally or externally coupled to the portable terminal 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, and the like.

The position location module 115 denotes a module for detecting or calculating a position of a portable terminal. An example of the position location module 115 may include a Global Position System (GPS) module.

The A/V input unit 120 is configured to provide audio or video signal input to the mobile terminal. The A/V input unit 120 may include a camera 121 and a microphone 122. The camera 121 receives and processes image frames of still pictures or video obtained by image sensors in a video (telephony) call mode or a capturing mode. The processed image frames may be displayed on a display unit 151.

The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the orientation of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device and the like. Moreover, the sensing unit 140 may include a proximity sensor 141.

The output unit 150 is configured to output an audio signal, a video signal or an alarm signal. The output unit 150 may include a display unit 151, an audio output module 152, an alarm 153, a haptic module 154 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a 'touch sensor') have a layered structure therebetween, the structure may be referred to as 'touch screen'. In this structure, the display unit 151 may be used as an input device rather than an output device. The touch sensor may be implemented as a touch film, a touch sheet, a touch pad, and the like.

The touch sensor may be configured to convert changes of a pressure applied to a specific part of the display unit 151, or a capacitance occurring from a specific part of the display unit 151, into electric input signals. Also, the touch sensor may be configured to sense not only a touched position and a touched area, but also a touch pressure.

When touch inputs are sensed by the touch sensors, corresponding signals are transmitted to a touch controller (not shown). The touch controller processes the received signals, and then transmits corresponding data to the controller 180. Accordingly, the controller 180 may sense which region of the display unit 151 has been touched.

As shown in FIG. 1, a proximity sensor 141 may be arranged at an inner region of the mobile terminal 100 covered by the touch screen, or near the touch screen. The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen is sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position corresponds to a position where the pointer faces perpendicular to the touch screen upon the proximity touch of the pointer.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component.

The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Figure 2:
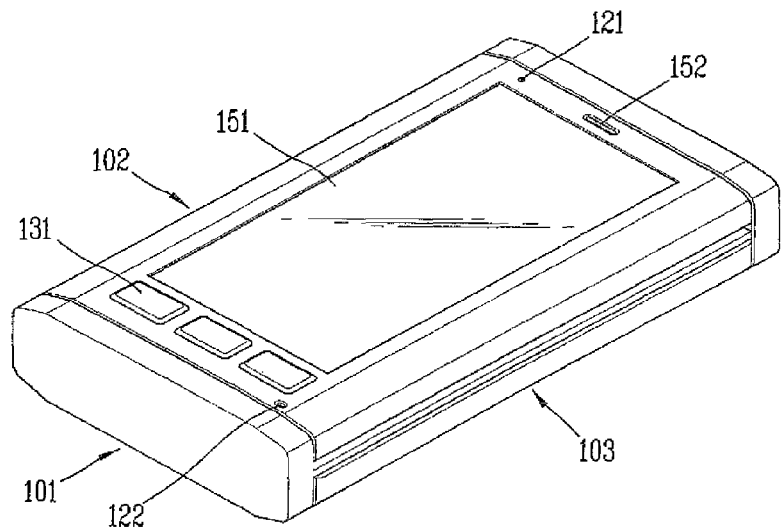
FIG. 2 is a perspective view illustrating a closed configuration of the mobile terminal in accordance with the one embodiment of the present invention.
Figure 3:
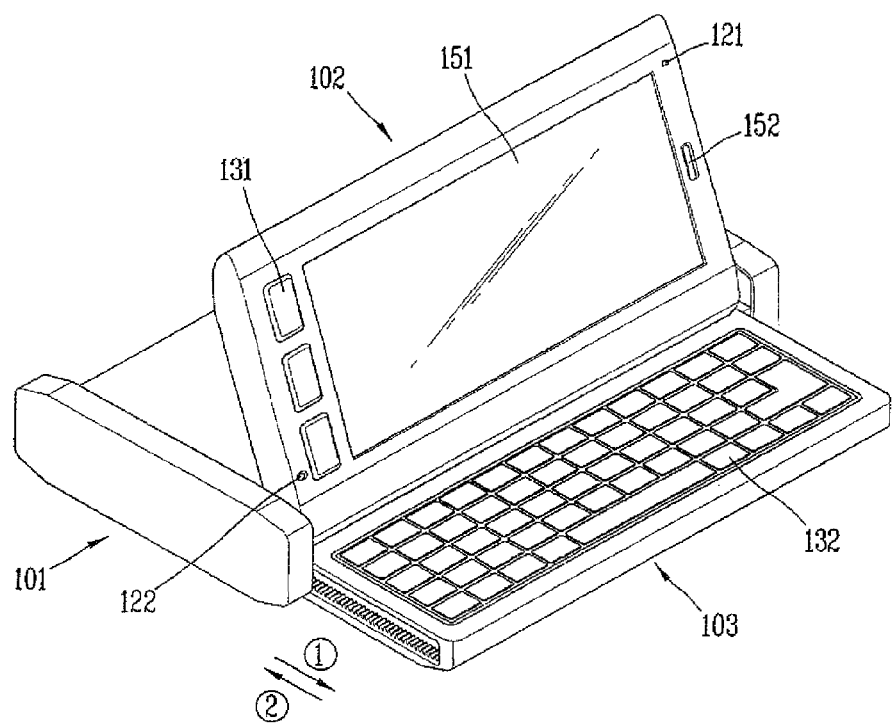
FIG. 3 is a perspective view illustrating an open configuration of the mobile terminal in accordance with the one embodiment of the present invention.

FIGS. 2 and 3 are perspective views each showing a mobile or portable terminal in accordance with one embodiment of the present invention.

A mobile terminal according to the one embodiment may include a main body 101, an upper body 102 and a lower body 103.

The upper and lower bodies 102 and 103 may be disposed on upper and lower sides of the main body 101 to be relatively movable with respect to the main body 101.

The upper body 102 may be disposed to be tiltable from the main body 101 by a preset angle (e.g., an angle as tilted as a user conveniently facing it). The upper body 102 may be tiltable from an overlapped state with the main body 101 as shown in FIG. 2 up to a preset angle (e.g., up to)50~60° with respect to the main body 101 as shown in FIG. 3. According to the one embodiment, the tilting is achieved in response to relative rotation of the upper body 102 with respect to the main body 101.

The lower body 103 may be disposed to be retractable into the main body 101. That is, the lower body 103 may be disposed to be relatively movable between the overlapped state with the main body 101 as shown in FIG. 2 and a partially exposed state as shown in FIG. 3. According to the one embodiment, the lower body 103 may be relatively slidable with respect to the main body 101.

The lower body 103 may be configured to be drawn out of the main body 101 responsive to tilting of the upper body 102 from the main body 101. That is, the upper and lower bodies 102 and 103 may cooperate with each other so as to be relatively movable with respect to the main body 101.

Hereinafter, if the main body 101, the upper body 102 and the lower body 103 are stacked (overlaid) together as shown in FIG. 2, the state is referred to as 'closed configuration'. If the upper body 102 is tilted by a preset angle and the lower body 103 is drawn out as shown in FIG. 3, this state is referred to as 'open configuration.'

If the upper body 102 in the closed configuration (closed state) is rotated by a preset angle, the lower body 103 is slid from one end of the main body 101 to another end thereof in cooperation with the rotation of the upper body 102, namely, slid in a first direction ①. Accordingly, the mobile terminal is changed (converted, switched) from the closed configuration into the open configuration (open state). Here, a rotational shaft for rotation of the upper body 102 may be formed at a portion corresponding to the another end of the main body 101.

If the lower body 103 in the open configuration is slid in a second direction ②, the upper body 102 is rotated in an opposite direction to the tilting direction in cooperation with the sliding of the lower body 103, thereby being changed to the closed configuration. In addition, if the upper body 102 in the open configuration is rotated in an opposite direction to the tilting direction, the lower body 103 may be slid in the second direction ② to be changed to the closed configuration.

The one embodiment illustrates that the lower body 103 is accommodated within the main body 101 in the closed configuration; however, any configuration may be available in which at least a part of the lower body 103 is externally exposed even in the closed configuration.

For instance, the one embodiment illustrates a structure in which the main body 101 wraps side surfaces of the lower body 103 in the closed configuration; however, a structure may also be considered in which side surfaces of the main body 101 are exposed in the closed configuration. Here, the aforesaid concept 'draw out' may also include a case where the lower body 103 is slid in the second direction 2 in the overlapped state with the upper body 102.

Each of the main body 101, the upper body 102 and the lower body 103 may include a case (casing, cover, housing) forming an outer appearance thereof. The cases may be formed by injection-molded synthetic resin, or may be formed using a metallic material such as stainless steel (STS) or titanium (Ti).

The upper body 102 is shown having a display unit 151, an audio output module 152, a camera 121, a first manipulation unit 131, a microphone 122 and the like. The lower body 103 is shown having a second manipulation unit 132.

The display unit 151 may occupy most of the principal surface of the upper body 102. The audio output module 152 and the camera 121 may be disposed at a region adjacent to one of both ends of the display unit 151, and the first manipulation unit 131 and the microphone 122 may be disposed at a region adjacent to another end thereof.

The first and second manipulation units 131 and 132 may be implemented as a type of a user input unit 130. The manipulation units 131 and 132 may employ any tactile manner that a user can touch or tap for manipulation.

Contents input via the first or second manipulation unit 131 or 132 may be variously set. For instance, the first manipulation unit 131 may be configured to input commands such as START, END, SCROLL or the like, and the second manipulation unit 132 may be configured to input numerals, characters, symbols and the like.

The second manipulation unit 132 may be implemented as a keypad having keys in a QWERTY configuration so as to facilitate input of characters or the like. The second manipulation unit 132 may be obscured by the main body 101 in the closed configuration, and externally exposed to allow input in the open configuration.

The mobile terminal may be configured in a bar shape in the closed configuration, and usually operate in an idle mode, a phone call mode and the like in the closed configuration. The mobile terminal may be configured in the open configuration to allow performing of additional functions of the mobile terminal, such as entering messages, playing music or video or the like.

Figure 4:
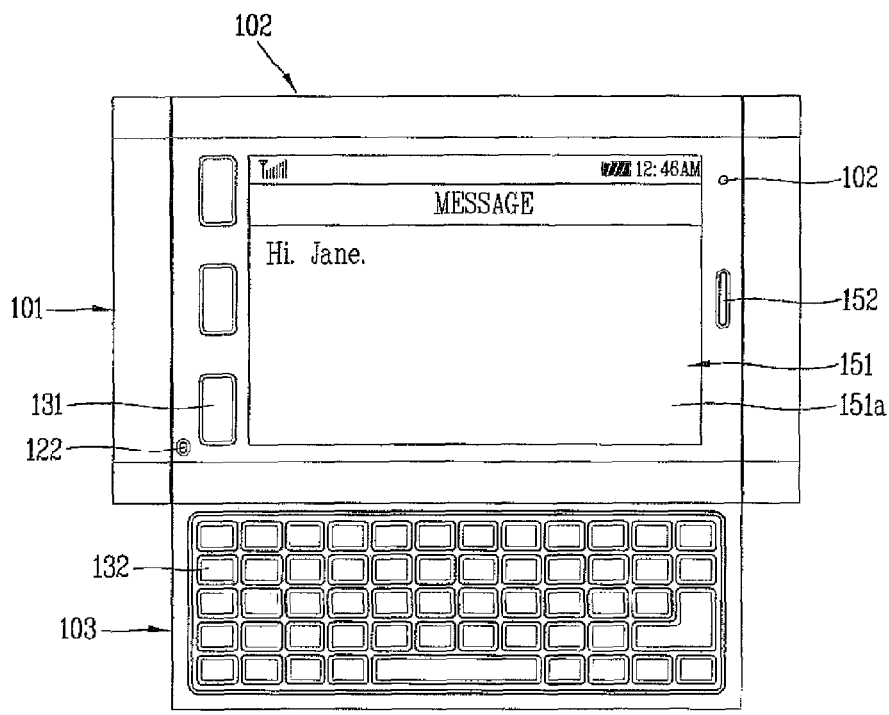
FIGS. 4 and 5 are planar views each illustrating an open configuration of the mobile terminal in accordance with the one embodiment of the present invention.
Figure 5:
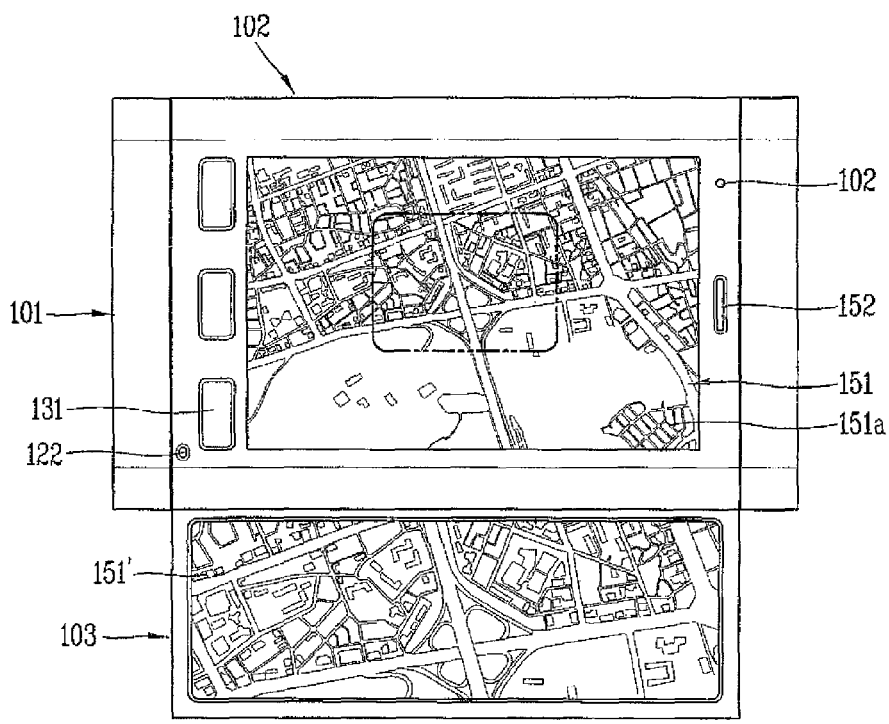

FIGS. 4 and 5 are planar views of the mobile terminal in the open configuration.

As shown in FIG. 4, the lower body 103 may be provided with the user input unit 130 for control of operations of the mobile terminal. This embodiment exemplarily illustrates employing of the second manipulation unit 132 in a QWERTY configuration as the user input unit 130.

FIG. 5 illustrates that characters, numbers, symbols and the like for transmission of messages are inputtable via the second manipulation unit 132. Here, the display unit 151 may be set such that its screen output direction is switched responsive to the change from the closed configuration into the open configuration of the mobile terminal. Also, upon inputting information via the second manipulation unit 132, the corresponding information may be displayed on an output window 151a of the display unit 151.

Besides, various information can be input into the mobile terminal by using the user input unit 130 in the open configuration. In this structure, the upper surface of the lower body 103 having a relatively wide space may be used as a mounting space for a keypad. Consequently, a QWERTY type keypad having many keys may be mounted at the mounting space or sizes of keys, which have been mounted, can be enlarged, thereby improving space applicability.

Referring to FIG. 5, the lower body 103 may also be provided with a display unit 151' other than the user input unit 130. In this structure, the display unit 151 (hereinafter, refer to as 'first display') of the upper body 102 and the display unit 151' (hereinafter, refer to as 'second display') may be configured to output different visual information. Alternatively, the first and second displays 151 and 151' may be configured to output associated visual information.

FIG. 5 exemplarily illustrates that a full map is output on the first display 151 and a detailed map for a selected portion of the full map is output on the second display 151'.

If at least one of the first and second displays 151 and 151' is implemented in a type of a touch screen, one of them may be touched so as to control the other.

For example, a touch-sensitive soft key or a writing region for writing input may be output on the second display 151', and contents input via the second display 151' may be displayed on the first display 151. That is, output information of the first display 151 may be controllable by a touch input via the second display 151'.

According to this structure, the two displays 151 and 151' each having a large screen can be mounted at the terminal, thus providing users with an advantage of simultaneous use of the two displays 151 and 151'.

So far, description has been given that the user input unit 130 and the display unit 151' are disposed on the upper surface of the lower body 103; besides, various components for input or output of information, connection with external devices and the like may also be disposed on the lower body 103. In this specification, the components are referred to as 'user interface' as a concept for including all the components, namely, the user interface may be a concept including the display 151' allowing users' input and output, the user input unit 130, an output unit and the like.

Hereinafter, a detailed structure of the mobile terminal according to this embodiment will be described.

Figure 6:
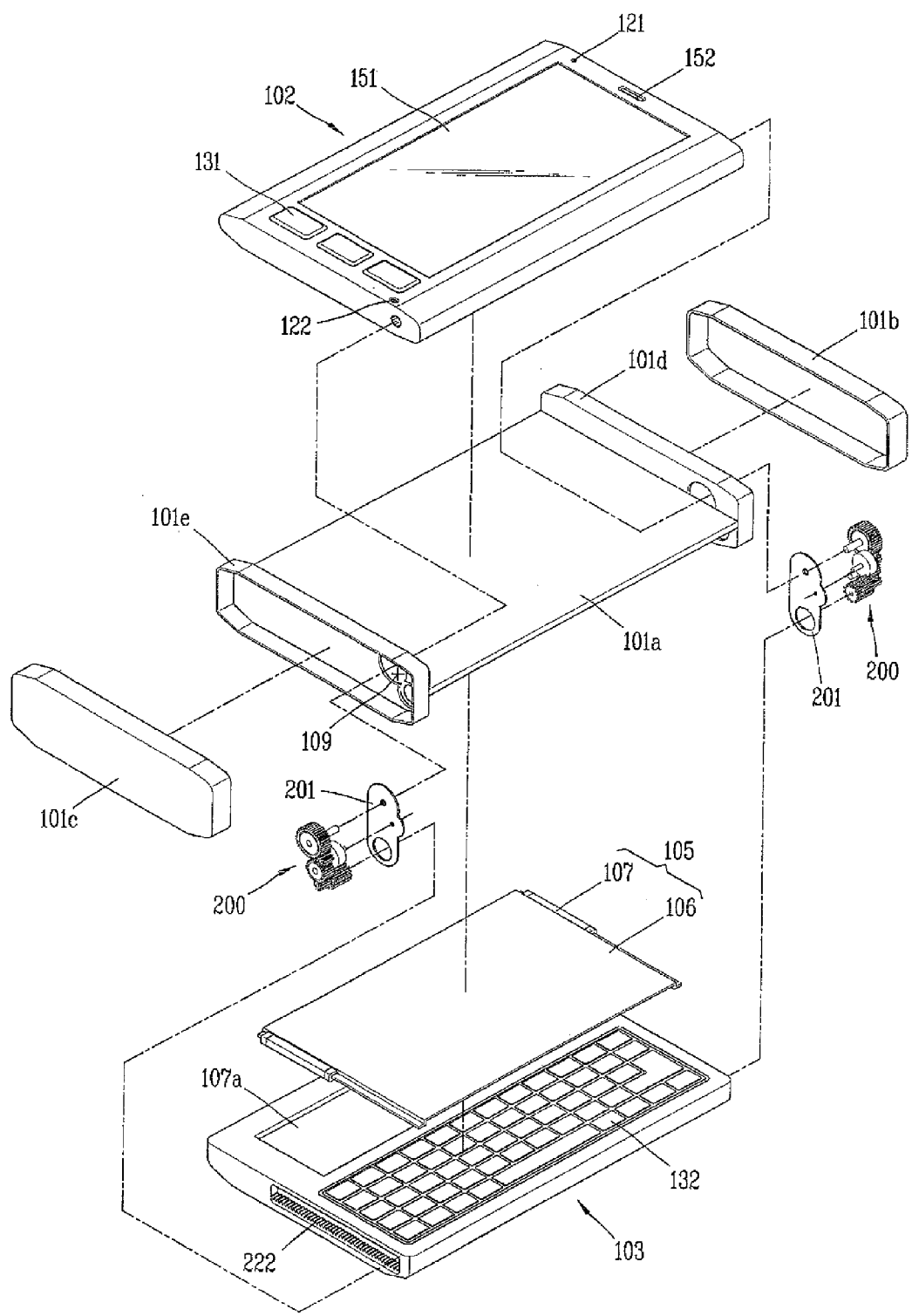
FIG. 6 is a disassembled perspective view of the mobile terminal shown in FIGS. 2 and 3.

FIG. 6 is a disassembled perspective view of the mobile terminal shown in FIGS. 2 and 3.

Referring to FIG. 6, the main body 101 may include a supporting plate 101a located between the upper body 102 and the lower body 103, and covers 101b and 101c coupled to both sides of the supporting plate 101a.

A side module 105 may be located between the supporting plate 101a and the lower body 103. The side module 105 may be employed such that the main body 101 is relatively slidably coupled to the lower body 103. The slide module 105 may include first and second slide members 106 and 107 slidably coupled to each other.

The first slide member 106 may be secured with a lower surface of the supporting plate 101a, and the second slide member 107 may be secured with a mounting portion 107a formed on an upper surface of the lower body 103.

A driving unit 200 may be disposed between the upper body 102 and the lower body 103 so as to draw the lower body 103 out of the main body 101 responsive to tilting of the upper body 102. The driving unit 200 may be configured to rotatably connect the upper body 102 to the lower body 103 and convert a rotating motion of the upper body 102 into a linear motion of the lower body 103.

The driving unit 200 may be coupled as a pair to both sides of the upper and lower bodies 102 and 103. Also, the driving unit 200 may be disposed outside side plates 101d and 101e formed at the supporting plate 101a, thereby connecting the upper and lower bodies 102 and 103 to each other. The side plates 101d and 101e may have through holes 109 for connecting the driving unit 200 to the upper and lower bodies 102 and 103.

The covers 101b and 101c may be coupled to both of the side plates 101d and 101e of the supporting plate 101a so as to veil the driving units 200. The covers 101b and 101c may be configured to shield side surfaces of the upper and lower bodies 102 and 103.

Figure 7:
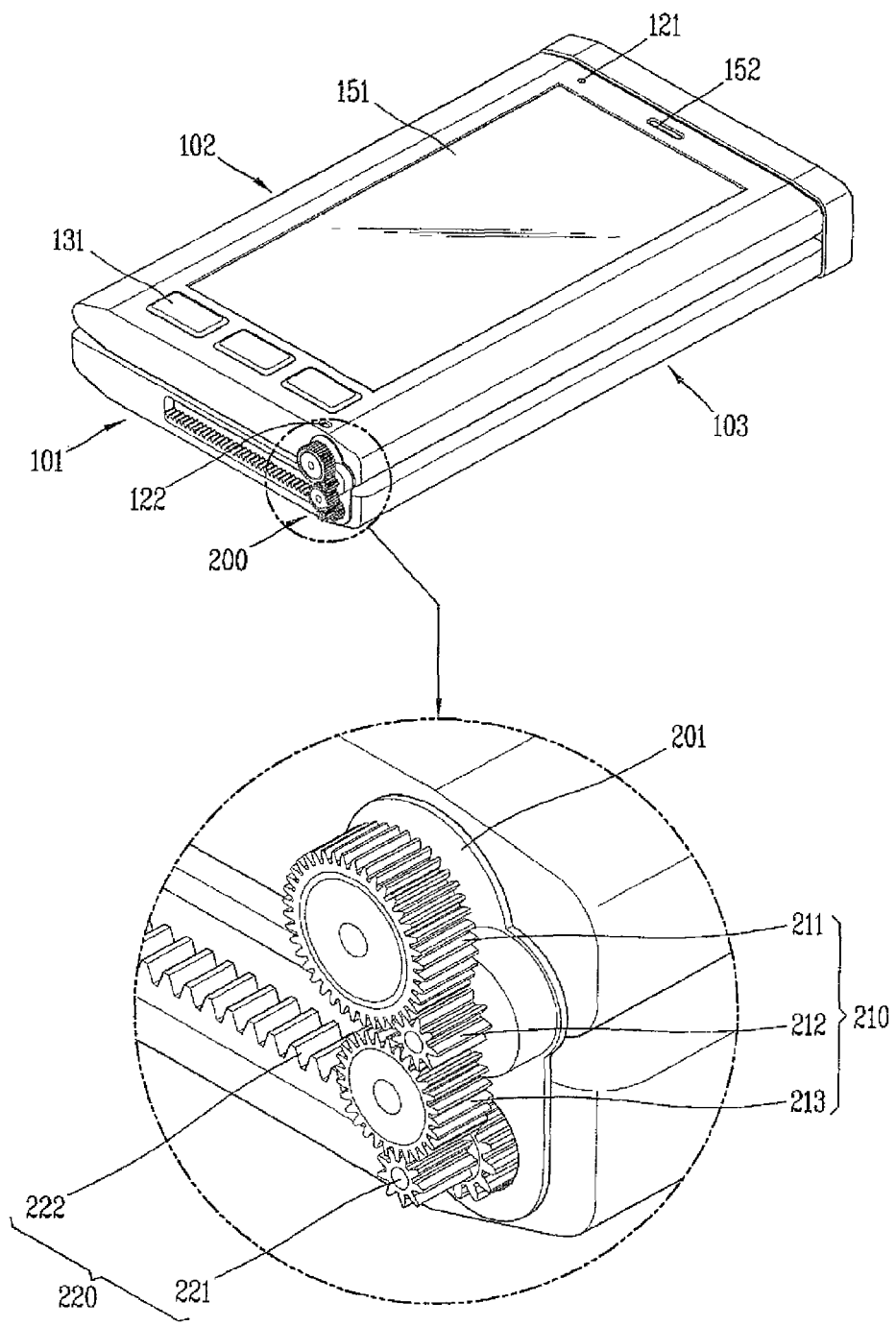
FIG. 7 is a perspective view illustrating a configuration of a driving unit of the mobile terminal.
Figure 8:
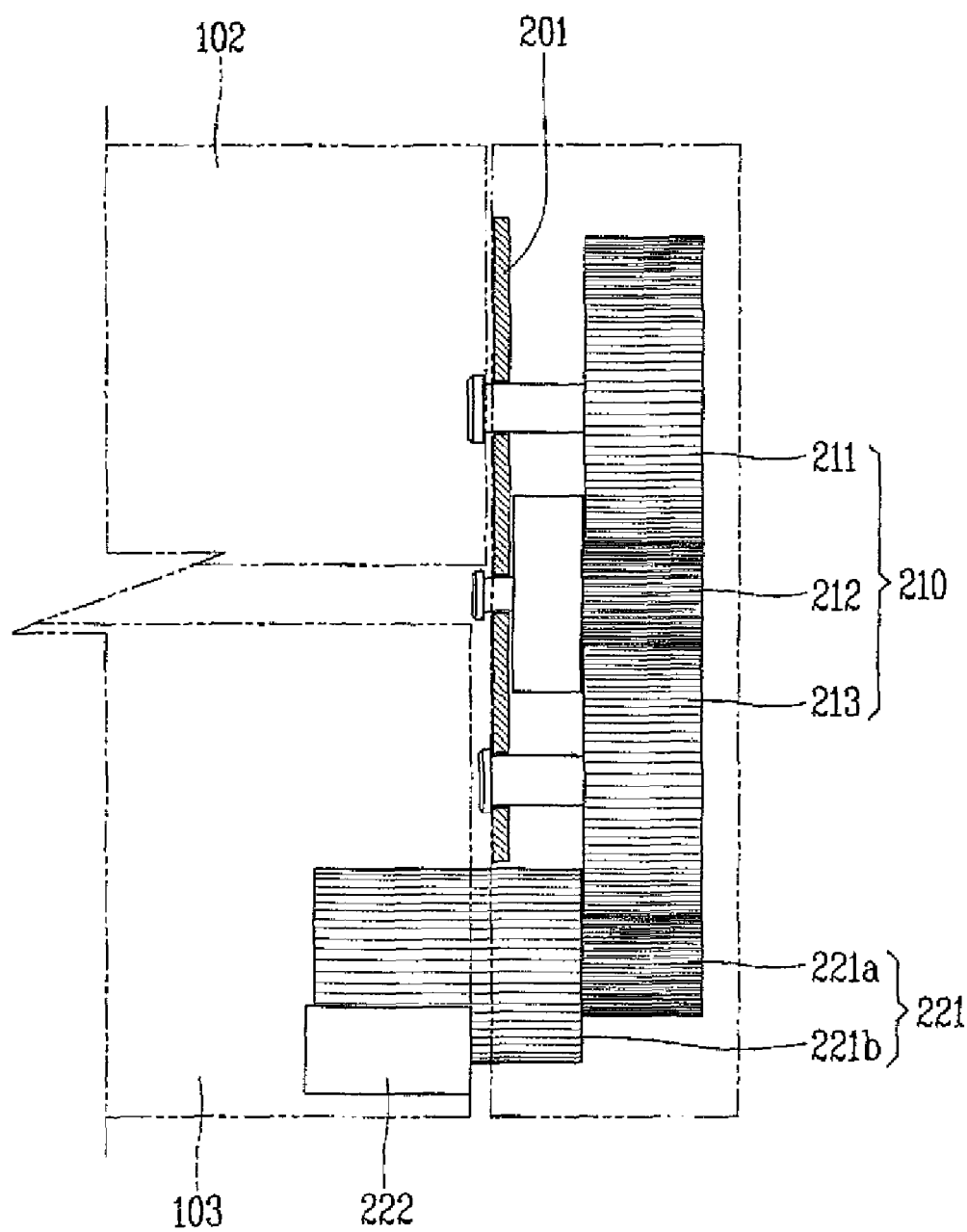
FIG. 8 is a side view of the driving unit shown in FIG. 7.

FIG. 7 is a perspective view illustrating a configuration of the driving unit of the mobile terminal, and FIG. 8 is a side view of the driving unit shown in FIG. 7. These drawings do not show the main body 101 for the sake of explanation.

As shown in FIGS. 7 and 8, each of the driving units 200 may include a driving force forwarding unit 210 connected to the upper body 102 and a driving force converting unit 220 connected to the lower body 103.

The driving force forwarding unit 210 may be configured to forward a rotational force of the upper body 102 to the lower body 103, and the driving force converting unit 220 may be configured to convert the rotational force delivered from the driving force forwarding unit 210 so as to allow a linear motion of the lower body 103.

According to the embodiment, the driving force forwarding unit 210 may include a first pinion gear 211 fixed to the upper body 102, a third pinion gear 212 engaged with the first pinion gear 211, and a fourth pinion gear 213 engaged with the third pinion gear 212.

A gear supporting portion 201 in a shape of a plate is mounted to the lower body 103, and the pinion gears are rotatably coupled to the gear supporting portion 201.

The first pinion gear 211 is fixed to one side of the upper body 102 and configured to be rotated together with the upper body 102 in cooperation with the rotation of the upper body 102.

The third pinion gear 212 may have a circular pitch smaller than that of the first pinion gear 211, and be engaged with the first pinion gear 211 to be rotated in an opposite direction to the first pinion gear 211 being rotated.

The fourth pinion gear 213 has a circular pitch greater than that of the third pinion gear 212, and be engaged with the third pinion gear 212 to be rotated in an opposite direction to the third pinion gear 212 being rotated. That is, the fourth pinion gear 213 is rotated in the same direction to the first pinion gear 211 being rotated.

The driving force converting unit 220 may include a second pinion gear 221 engaged with the fourth pinion gear 213, and a rack gear 222 formed on the lower body 103 and engaged with the second pinion gear 221.

The second pinion gear 221 may be rotated with being engaged with the fourth pinion gear 213, and have a circular pitch smaller than that of the fourth pinion gear 213. In other words, the fourth pinion gear 213 may be disposed between the second pinion gear 221 and the third pinion gear 212 so as to be engaged with the same.

The second pinion gear 221 may be rotated in an opposite direction to the fourth pinion gear 213 being rotated, namely, an opposite direction to the first pinion gear 211 being rotated.

The second pinion gear 221 may include a first gear portion 221a engaged with the fourth pinion gear 213 and a second gear portion 221b extending to one side from the first gear portion 221a. Here, the second gear portion 221b may be formed to have a tooth thickness thicker than that of the first gear portion 221a.

The rack gear 222 may be formed at both side surfaces of the lower body 103 in a direction that the lower body 103 is drawn out, and have a length corresponding to a drawn-out length (i.e., slid length) of the lower body 103. The rack gear 222 may be configured to be engaged with the second gear portion 221b, and have a tooth thickness corresponding to the tooth thickness of the second gear portion 221b, namely, relatively thicker than that of the first pinion gear 211.

Accordingly, the rack gear 222 may have a relatively thicker tooth thickness, so as to enable more reliable sliding of the lower body 103.

This embodiment has illustrated the first, third and fourth pinion gears 211, 212 and 213 belonging to the driving force forwarding unit 210; alternatively, the driving force forwarding unit 210 may include only the first pinion gear 211. With this configuration, the first pinion gear 211 may be engaged directly with the second pinion gear 221 so that the second pinion gear 221 is rotated in an opposite direction to the first pinion gear 211 being rotated in cooperation with the rotation of the first pinion gear 211.

According to this embodiment, a plurality of pinion gears having different circular pitches are employed to reduce the circular pitches of the pinion gears, resulting in minimizing the volume (or area) occupied by the driving force forwarding unit 210.

Figure 9A:
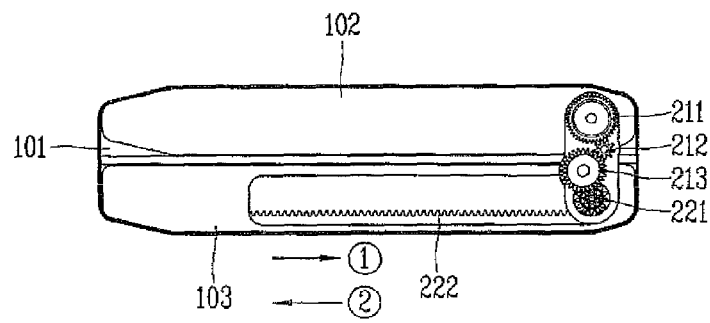
FIGS. 9A to 9C are front views showing operating states of the driving unit in the mobile terminal.
Figure 9B:
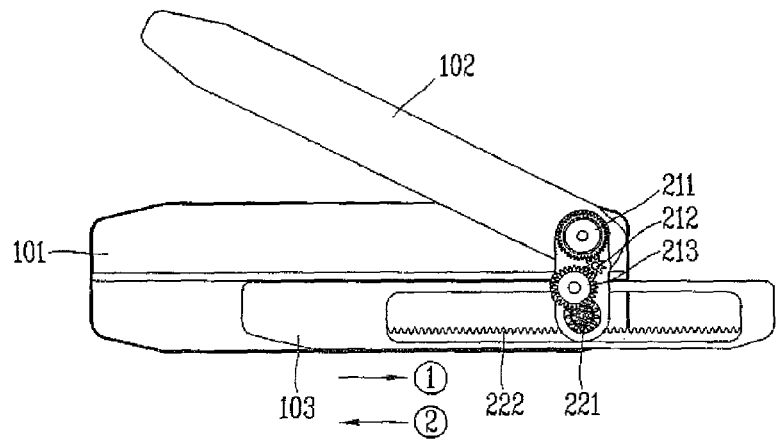
Figure 9C:
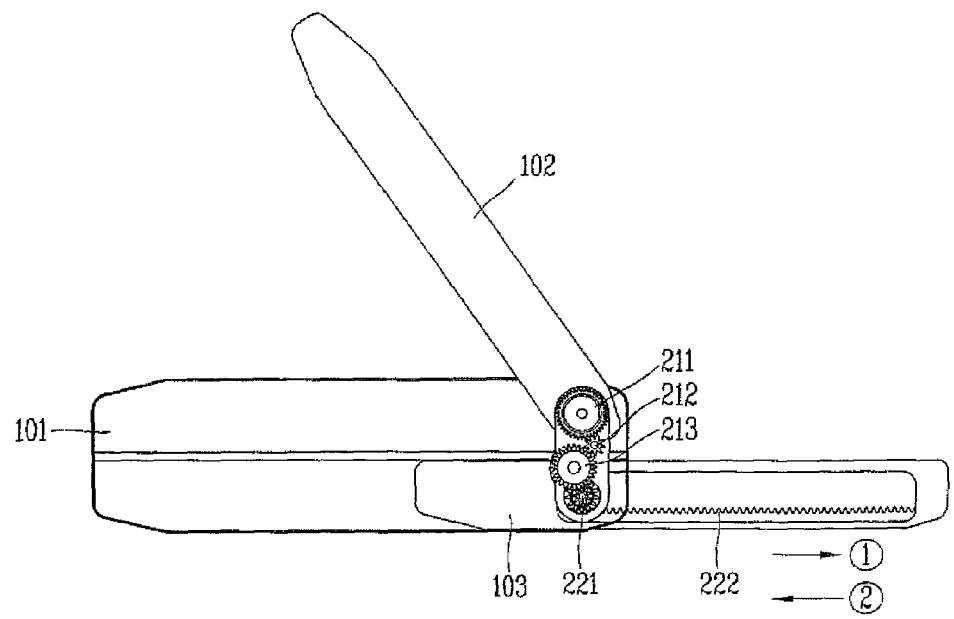

FIGS. 9A to 9C are front views illustrating operating states of the driving unit in the mobile terminal.

FIG. 9A illustrates a closed configuration of the mobile terminal, in which the upper body 102 and the lower body 103 are overlapped with each other.

As shown in FIG. 9A, if the upper body 102 in the closed configuration is rotated, the first pinion gear 211 is rotated integrally with the upper body 102. The first pinion gear 211 is rotated in a clockwise direction in the drawing.

In response to the rotation of the first pinion gear 211, the third pinion gear 212 is rotated in a counterclockwise direction and the fourth pinion gear 213 is rotated in a clockwise direction.

The second pinion gear 221 is rotated in a counterclockwise direction responsive to the clockwise rotation of the fourth pinion gear 213. Cooperatively, the rack gear 222 is linearly moved in a first direction ①. The lower body 103 is slid in the first direction ① in cooperation with the linear motion of the rack gear 222.

The lower body 103 is drawn out of the main body 101 as long as the length of the rack gear 222. When the lower body 103 is completely drawn out, as shown in FIG. 9C, the upper body 102 is tilted and the lower body 103 is converted to an open (drawn-out) state.

The conversion from the open configuration to the closed configuration is executed in reverse order of the previously described operation. For example, if the lower body 103 is slid in the second direction ②, the second pinion gear 221 is rotated in a clockwise direction, and cooperatively the fourth pinion gear 213 is rotated in a counterclockwise direction.

The third pinion gear 212 is then rotated in a clockwise direction responsive to the counterclockwise rotation of the fourth pinion gear 213, and the first pinion gear 211 is rotated in a counterclockwise direction responsive to the clockwise rotation of the third pinion gear 212. Accordingly, the upper body 102 is rotated in an opposite direction to its tilting direction. That is, if the lower body 103 in the open configuration is slid into the main body 101, the upper body 102 is cooperatively rotated to be converted to the closed configuration.

Figure 10:
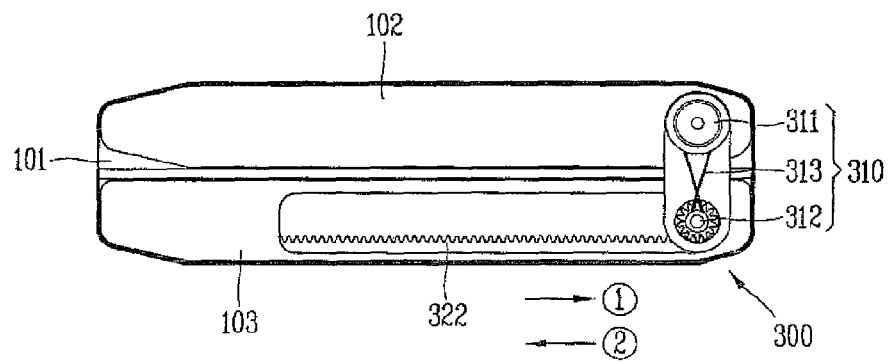
FIG. 10 is a front view illustrating a driving unit of a mobile terminal in accordance with another embodiment of the present invention.
Figure 11:
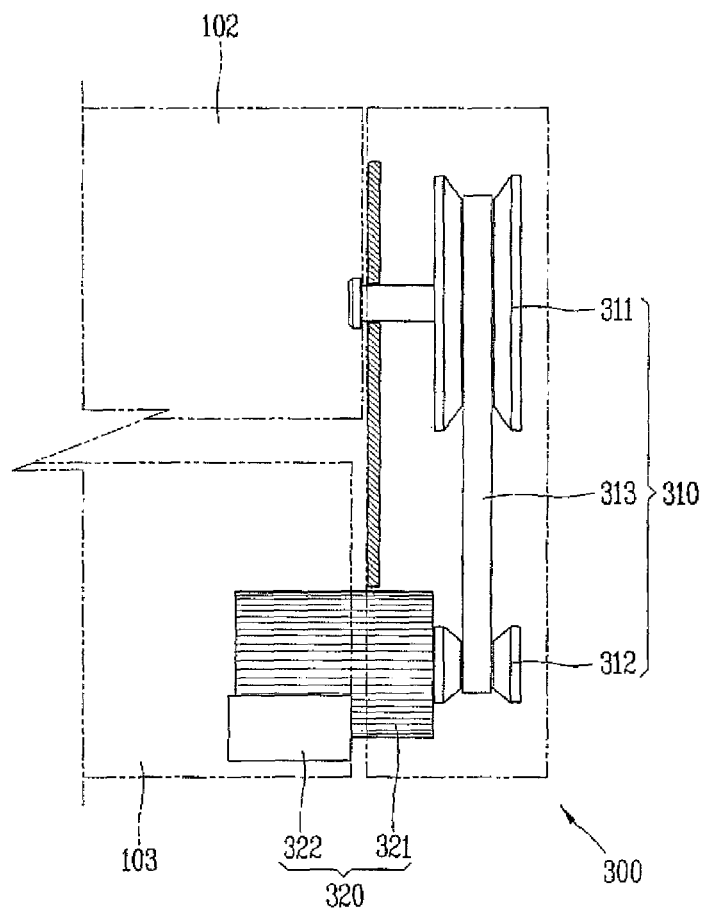
FIG. 11 is a side view of the driving unit shown in FIG. 10.

FIG. 10 is a front view illustrating a driving unit of a mobile terminal in accordance with another embodiment of the present invention, and FIG. 11 is a side view of the driving unit shown in FIG. 10.

The mobile terminal according to the another embodiment has the same configuration to that of the mobile terminal of the previously embodiment excluding a driving unit 300.

Thus, the same configuration to that of the previous embodiment will not be described again, and the same or similar components will be given of similar reference numerals.

The driving unit 300 according to the another embodiment, as similar to the previous embodiment, may include a driving force forwarding unit 310 for forwarding a rotational force of the upper body 102 to the lower body 103, and a driving force converting unit 320 for converting the rotational force delivered from the driving force forwarding unit 310.

According to this embodiment, the driving force forwarding unit 310 may include a first shaft 311 connected to the upper body 102, a second shaft 312 located at one side of the first shaft 311, and a driving force forwarding belt 313 for forwarding a rotational force of the first shaft 311 to the second shaft 312.

The first shaft 311 may be secured with the upper body 102 so as to be rotated integrally with the upper body 102, and the second shaft 312 may deliver the rotational force from the first shaft 311 to the driving force converting unit 320.

The driving force forwarding belt 313 may wrap up outer circumferential surfaces of the first and second shafts 311 and 312 and be frictionally contactable with the outer circumferential surfaces of the first and second shafts 311 and 312 for sufficient driving force delivery. The driving force forwarding belt 313 may be disposed to be twisted in a shape similar to 'X' such that the first and second shafts 311 and 312 have opposite rotating directions.

The driving force converting unit 320 may include a pinion gear 321 extending from the second shaft 312, and a rack gear 322 formed at the lower body 103 to be engaged with the pinion gear 321. The configurations of the pinion gear 321 and the rack gear 322 correspond to the configurations of the second gear portion 221b and the rack gear 222, so a detailed description thereof will not be repeated.

Operating states of the driving unit 300 according to this embodiment will now be described.

As the upper body 102 in the closed configuration is rotated, the first shaft 311 is rotated in a clockwise direction in FIG. 10. Accordingly, the driving force forwarding belt 313 is driven, so the second shaft 312 is rotated in a counterclockwise direction.

Responsive to this, the pinion gear 321 integrally formed with the second shaft 312 is also rotated in the counterclockwise direction, and the rack gear 322 engaged with the pinion gear 312 is linearly moved in a first direction ①. Consequently, the lower body 103 is slid on the main body 101 in the first direction 1 so as to be drawn out of the main body 101, resulting in conversion of the mobile terminal to an open configuration.

The conversion from the open configuration to the closed configuration may be executed in reverse order of the previously described operation, and similarly executed to the previous embodiment, a detailed description of which will thusly be omitted.

The configuration of the driving unit 200 or 300 may not be limited to those having described; however, those configurations can be replaced with any configuration capable of converting the rotation of the upper body 102 into a linear motion of the lower body 103.

As described above, the present invention provides a structure of drawing a lower body out of a main body in response to tilting of an upper body, thereby not only implementing convenient user interface environments but also achieving a structure of further enlarging an installation space for components, such as display units, a user input unit and the like.

The aforesaid configuration and method for the mobile terminal is not to be construed as limiting the present disclosure. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a main body comprising a first edge, wherein the main body comprises an upper surface, and wherein the main body is shaped to define a cavity;
    an upper body comprising an upper surface and a lower surface, the upper body being rotatably coupled to the main body at an area proximate to the first edge, wherein the upper body is configured to be rotated between a first position and a second position, wherein when the upper body is in the first position the upper body overlaps and substantially covers the upper surface of the main body, and wherein when the upper body is in the second position an acute angle is formed between the upper body and the upper surface of the main body;
    a display unit configured to be touch sensitive and located at the upper surface of the upper body such that visual information displayed on the display unit is visible when the upper body is in the first position;
    a user interface;
    a lower body being configured to include the user interface, wherein the lower body is sized to be received within the cavity of the main body;
    a driving unit configured to drive the lower body to achieve relative reciprocal linear motion between the lower body and the first edge of the main body, wherein the driving unit operatively couples the upper body with the lower body such that rotational movement of the upper body between the first and second positions causes the linear motion between the lower body and the main body, and wherein when the upper body is in the second position the acute angle is formed between the upper body and the upper surface of the main body and an obtuse angle is formed between the upper body and the user interface.

2. The terminal of claim 1, wherein the user interface comprises at least a second display unit configured to output visual information or a user input unit configured to control operations of the mobile terminal.

3. The terminal of claim 1, wherein:
    the lower body is drawn out of the main body by sliding from a first end of the main body to a second end of the main body; and
    the rotational shaft of the upper body is formed at a portion of the main body corresponding to the second end.

4. The terminal of claim 1, wherein the driving unit is further configured to:
    rotatably connect the upper body to the lower body; and
    convert a rotating motion of the upper body into a linear motion of the lower body.

5. The terminal of claim 4, wherein the driving unit comprises:
a driving force forwarding unit connected to the upper body and configured to transfer a rotational force of the upper body to the lower body; and
a driving force converting unit connected to the lower body and configured to convert the rotational force transferred from the driving force forwarding unit into the linear motion of the lower body.

6. The terminal of claim 5, wherein:
the driving force forwarding unit comprises a first pinion gear secured to the upper body and configured to rotate; and
the driving force converting unit comprises:
a second pinion gear configured to rotate in a direction opposite to a rotation direction of the first pinion gear, and
a rack gear formed on the lower body that engages the second pinion gear.

7. The terminal of claim 6, wherein the second pinion gear comprises:
a first gear portion engaging a fourth pinion gear and configured to rotate in a direction opposite to the rotation direction of the first pinion gear; and
a second gear portion extending from one side of the first gear portion and engaging the rack gear.

8. The terminal of claim 6, wherein the driving force forwarding unit further comprises:
a third pinion gear engaging the first pinion gear; and
a fourth pinion gear located between the second pinion gear and third pinion gear and engaging both the second pinion gear and third pinion gear.

9. The terminal of claim 5, wherein:
the driving force forwarding unit comprises:
a first shaft connected to the upper body,
a second shaft located at one side of the first shaft, and
a driving force forwarding belt configured to transfer rotation of the first shaft to the second shaft; and
the driving force converting unit comprises:
a pinion gear extending from the second shaft, and
a rack gear formed on the lower body that engages the pinion gear.

10. The terminal of claim 1, wherein the main body comprises:
a supporting plate located between the upper body and the lower body; and
a cover coupled to both sides of the supporting plate and configured to shield the driving unit.

11. The terminal of claim 10, further comprising:
a slide module mounted between the supporting plate and the lower body and slidably connecting the main body to the lower body.

12. A mobile terminal comprising:
a main body comprising a first edge, wherein the main body comprises an upper surface, and wherein the main body is shaped to define a cavity;
an upper body comprising an upper surface and a lower surface, the upper body being rotatably coupled to the main body at an area proximate to the first edge, wherein the upper body is configured to be rotated between a first position and a second position, wherein when the upper body is in the first position the upper body overlaps and substantially covers the upper surface of the main body, and wherein when the upper body is in the second position an acute angle is formed between the upper body and the upper surface of the main body;
a display unit configured to be touch sensitive and located at the upper surface of the upper body such that visual information displayed on the display unit is visible when the upper body is in the first position;
a user interface;
a lower body being configured to include the user interface, wherein the lower body is sized to be received within the cavity of the main body; and
a driving unit configured to drive the lower body to achieve relative reciprocal linear motion between the lower body and the first edge of the main body, wherein the driving unit operatively couples the upper body with the lower body such that rotational movement of the upper body between the first and second positions causes the linear motion between the lower body and the main body, and wherein when the upper body is in the second position the acute angle is formed between the upper body and the upper surface of the main body and an obtuse angle is formed between the upper body and the user interface.

13. The terminal of claim 12, wherein the lower body comprises at least a second display unit configured to output visual information or a user input unit configured to control operations of the mobile terminal.

14. The terminal of claim 12, wherein:
the driving unit slides the lower body out of the main body from a first end of the main body to a second end of the main body; and
the rotational shaft of the upper body is formed at a portion of the main body corresponding to the second end.

15. The terminal of claim 12, wherein the driving unit comprises:
a driving force forwarding unit connected to the upper body and configured to transfer a rotational force of the upper body to the lower body; and
a driving force converting unit connected to the lower body and configured to convert the rotational force transferred from the driving force forwarding unit into a linear motion of the lower body.

16. The terminal of claim 15, wherein:
the driving force forwarding unit comprises a first pinion gear secured to the upper body and configured to rotate; and
the driving force converting unit comprises:
a second pinion gear configured to rotate in a direction opposite to a rotation direction of the first pinion gear, and
a rack gear formed on the lower body that engages the second pinion gear.

17. The terminal of claim 16, wherein the second pinion gear comprises:
a first gear portion engaging a fourth pinion gear and configured to rotate in a direction opposite to the rotation direction of the first pinion gear; and
a second gear portion extending from one side of the first gear portion and engaging the rack gear.

18. The terminal of claim 16, wherein the driving force forwarding unit further comprises:
a third pinion gear engaging the first pinion gear; and
a fourth pinion gear located between the second pinion gear and third pinion gear and engaging both the second pinion gear and third pinion gear.

19. The terminal of claim 12, wherein the main body comprises:
a supporting plate located between the upper body and the lower body; and
a cover coupled to both sides of the supporting plate and configured to shield the driving unit.

20. The terminal of claim 19, further comprising:
a slide module mounted between the supporting plate and the lower body and slidably connecting the main body to the lower body.

* * * * *